(12) United States Patent
Maguire (10) Patent No.: US 9,371,198 B2
(45) Date of Patent: Jun. 21, 2016

(54) AIR FLOW REGULATOR

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 65 days.

(21) Appl. No.: 14/185,016

(22) Filed: Feb. 20, 2014

(65) Prior Publication Data

US 2015/0232287 A1    Aug. 20, 2015

(51) Int. Cl.
*G05D 7/01* (2006.01)
*B65G 53/66* (2006.01)

(52) U.S. Cl.
CPC ........................................ *B65G 53/66* (2013.01)

(58) Field of Classification Search
CPC ....... F16K 15/04; F16K 15/048; F16K 31/08; F16K 17/28; F16K 15/06; F16K 17/12; F16K 31/12
USPC ........... 138/45, 46; 137/519, 517, 513.3, 541, 137/533, 533.21
See application file for complete search history.

(56) References Cited

U.S. PATENT DOCUMENTS

| | | | |
|---|---|---|---|
| 1,001,510 A * | 8/1911 | Curbey | 137/517 |
| 1,418,096 A * | 5/1922 | Royer | 137/517 |
| 2,161,190 A | 6/1939 | Paull | |
| 3,111,115 A | 11/1963 | Best | |
| 3,115,276 A | 12/1963 | Johanningmeier | |
| 3,164,141 A * | 1/1965 | Jones | 123/574 |
| 3,209,898 A | 10/1965 | Beebe et al. | |
| 3,348,848 A | 10/1967 | Lucking et al. | |
| 3,367,362 A * | 2/1968 | Hoffman | 137/517 |
| 3,468,338 A * | 9/1969 | Patterson | 137/517 |
| 3,470,994 A | 10/1969 | Schnell et al. | |
| 3,735,777 A * | 5/1973 | Katzer et al. | 137/514.5 |
| 3,794,077 A * | 2/1974 | Fanshier | 137/513.3 |
| 3,959,636 A | 5/1976 | Johnson et al. | |
| 3,985,262 A | 10/1976 | Nauta | |
| 4,026,442 A | 5/1977 | Orton | |
| 4,108,334 A | 8/1978 | Moller | |
| 4,148,100 A | 4/1979 | Moller | |
| 4,219,136 A | 8/1980 | Williams et al. | |
| 4,354,622 A | 10/1982 | Wood | |
| 4,402,436 A | 9/1983 | Hellgren | |
| 4,454,943 A | 6/1984 | Moller | |
| 4,475,672 A | 10/1984 | Whitehead | |

(Continued)

FOREIGN PATENT DOCUMENTS

DE    3541532 A1    5/1986
DE    3923241       1/1991

(Continued)

OTHER PUBLICATIONS

AEC Whitlock Operation and Installation Manual for VacTrac™ Series Conveying Systems, Single-Station Controllers, Oct. 30, 1997.

(Continued)

*Primary Examiner* — Patrick F Brinson
(74) *Attorney, Agent, or Firm* — Charles N. Quinn; Fox Rothschild LLP (57) ABSTRACT

Method and apparatus for air flow regulation comprise a vertically oriented tube and a sail assembly positioned in the tube and moveable therewithin responsively to air flow through the tube to regulate rate of air flow through the tube and stop air flow through the tube upon air flow rate through the tube exceeding a preselected value.

17 Claims, 6 Drawing Sheets

(56) References Cited

U.S. PATENT DOCUMENTS

| | | | |
|---|---|---|---|
| 4,498,783 A | 2/1985 | Rudolph | |
| 4,525,071 A | 6/1985 | Horowitz et al. | |
| 4,581,704 A | 4/1986 | Mitsukawa | |
| 4,705,083 A | 11/1987 | Rossetti | |
| 4,756,348 A | 7/1988 | Moller | |
| 4,793,711 A | 12/1988 | Ohlson | |
| 4,830,508 A | 5/1989 | Higuchi et al. | |
| 4,842,198 A * | 6/1989 | Chang | 239/200 |
| 4,848,534 A | 7/1989 | Sandwall | |
| 4,850,703 A | 7/1989 | Hanaoka et al. | |
| 5,110,521 A | 5/1992 | Moller | |
| 5,116,547 A | 5/1992 | Tsukahara et al. | |
| 5,132,897 A | 7/1992 | Allenberg | |
| 5,143,166 A | 9/1992 | Hough | |
| 5,148,943 A | 9/1992 | Moller | |
| 5,172,489 A | 12/1992 | Moller | |
| 5,225,210 A | 7/1993 | Shimoda | |
| 5,252,008 A | 10/1993 | May, III et al. | |
| 5,261,743 A | 11/1993 | Moller | |
| 5,285,930 A | 2/1994 | Nielsen | |
| 5,340,949 A | 8/1994 | Fujimura et al. | |
| 5,341,961 A | 8/1994 | Hausam | |
| 5,423,455 A | 6/1995 | Ricciardi et al. | |
| 5,651,401 A | 7/1997 | Cados | |
| 5,704,391 A * | 1/1998 | McGowan et al. | 137/454.2 |
| 5,767,453 A | 6/1998 | Wakou et al. | |
| 5,767,455 A | 6/1998 | Mosher | |
| 5,780,779 A | 7/1998 | Kitamura et al. | |
| 5,843,513 A | 12/1998 | Wilke et al. | |
| 6,089,794 A | 7/2000 | Maguire | |
| 6,152,656 A | 11/2000 | Curtis et al. | |
| 6,199,583 B1 * | 3/2001 | Iacovella | 137/513.3 |
| 6,379,086 B1 | 4/2002 | Goth | |
| 6,413,020 B1 | 7/2002 | Davison | |
| 7,066,689 B2 | 6/2006 | Maguire | |
| 8,070,844 B2 | 12/2011 | Maguire | |
| 8,753,432 B2 | 6/2014 | Maguire | |
| 2005/0039816 A1 | 2/2005 | Maguire | |

FOREIGN PATENT DOCUMENTS

| | | |
|---|---|---|
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Whitlock Turbo-Vac™ Vacuum Power Units Installation,k Operation and Maintenance Manual, 1984.
AEC Whitlock Operation & Installation Manual—Continuous Vacuum/Pressure Conveying Systems, Single- and Dual-Blower Systems, Apr. 28, 1998.
AEC Whitlock Operation and Installation Manual WD Series WD350 to WD3000 Dehumidifying Dryers with Fuzzy Logic Controls, Oct. 11, 1995.
AEC Whitlock Operation and Installation Manual Nomad Series PD-2 to PD-4 Drying and Conveying Systems, Apr. 11, 1997.
AEC Whitlock HE—CHE—BCHE Mass Flow Series Dying Hoppers, Dec. 17. 1997.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender The Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc. *.

(56) References Cited

OTHER PUBLICATIONS

Four page two-sided color brochure entitled "Novatec Inc. Vacuum Loaders—Electro-Polished Stainless Steel Finish" of Novatec Inc., undated*.

Eight page two-sided color brochure entitled "Novatec Inc. Material Conveying Solutions for the Plastics Industry", 1999*.

Two page two-sided color brochure entitled "Maguire Model MPM Pre-Mixers of Maguire Products, Inc., Apr. 1997".

Two page two-sided color brochure entitled "WDMR Series Compact Dryers" of AEC Whitlock, 1998.

Two page two-sided color reprint entitled "10 most frequently asked questions about Dryers" by Joseph Dziediz, AEC/Whitlock, from Plastics Technology, Jan. 1998.

Two page two-sided color brochure entitled "Drying Systems: WD Series High Capacity Dehumidifying Dryers" of AEC Whitlock, 1997.

Five page two-sided color brochure entitled "AEC Auxiliaries as Primary", AEC, Inc., 1999.

* cited by examiner

AIR FLOW REGULATOR

BACKGROUND OF THE INVENTION

This invention relates to manufacture of plastic articles and more particularly relates to pneumatic conveyance and processing of plastic resin pellets prior to molding or extrusion of those pellets into a finished or semi-finished plastic product.

DESCRIPTION OF THE PRIOR ART

In facilities that fabricate plastic products by molding or extrusion, it is common to use "vacuum systems" to pneumatically convey pellets of thermoplastic resin, prior to molding or extrusion of those pellets into a finished or semi-finished product, from a central storage point to each of the many compression or injection plastic molding machines or plastic extruders scattered throughout the facility. Individual loaders, which are referred to as "integral" loaders because they contain their own vacuum motor and generate their own vacuum, can be used for conveying plastic resin pellets short distances, typically 20 feet or less. When the plastic resin pellets are purchased in 50 pound bags, 200 pound drums, or 1,000 pound containers commonly referred to as "Gaylords", these bags, drums, and/or containers can be placed close to the molding press or extruder and small integral loaders can be used to convey the plastic resin pellets from the storage bag, drum, or container to the molding press or extruder.

In this patent application, injection and compression molding presses and extruders are collectively referred to as "process machines."

Another approach for conveying plastic resin pellets from a storage location to a process machine, which approach is often used in larger facilities, is to install a central vacuum pump or even several vacuum pumps, connected by common vacuum lines to multiple "receivers." (Receivers are loaders which lack integral power units.)

Vacuum pumps connected to the vacuum lines draw vacuum, namely air pressure slightly below atmospheric, as the vacuum pump sucks air through the "vacuum" line. The suction moves large quantities of air which carry pellets of thermoplastic resin through the "vacuum" line. An alternative is to use positive pressure produced by a blower or the exhaust side of a vacuum pump. With such an approach, the positive pressure results in a movement of substantial amounts of air which may be used to carry plastic resin pellets.

In practice, vacuum pumps are preferred and vacuum lines are desirable in part because power requirements to create the required vacuum necessary to carry plastic resin pellets through the lines are lower than the power requirements if the plastic resin pellets are pushed through the lines by a blower or the exhaust side of a vacuum pump. When vacuum is used, the static pressure within the line may be not much less than atmospheric; when positive pressure is used, the dynamic pressure of the air flowing through the line must be relatively high in order to move adequate amounts of plastic resin pellets.

As used herein, and in light of the foregoing explanation, the terms "vacuum pump" and "blower" are used interchangeably.

When one or more central vacuum pumps are connected to multiple receivers, a receiver is located over each temporary storage hopper, in which the plastic resin pellets are temporarily stored before being molded or extruded, and a temporary storage hopper is associated with each process machine.

The receiver is connected by a control wire to a central control system. The control system works by selectively opening a vacuum valve located in each receiver, allowing one or several vacuum pumps to sequence drawing "vacuum", i.e. below atmospheric pressure air, to carry the pellets among and to multiple receivers as individual ones of the receivers, positioned over individual hoppers associated with the individual process machines, require additional plastic resin pellets. The receiver for a given hopper-process machine combination is actuated by opening the vacuum valve located in or near the receiver, causing the receiver to feed plastic resin pellets by gravity into the hopper from where the pellets may be fed by gravity downward into the associated process machine.

Large, high capacity industrial vacuum pumps are reliable and are suited to heavy duty industrial use. Use of large high capacity vacuum pumps allows long conveying distances for the plastic resin pellets. Currently available large capacity vacuum pumps permit plastic resin pellets to be conveyed over distances of 200 feet or more using vacuum drawn by the pump. Use of such high capacity vacuum pumps results in a big rush of below atmospheric pressure air through the line, carrying the plastic resin pellets over a long distance.

Operators of plastic manufacturing facilities prefer to buy plastic resin pellets in bulk, in rail cars or tanker trucks. Bulk purchases result in cost savings. Plastic resin pellets delivered in bulk are typically pumped into large silos for storage. In a large manufacturing facility, the distance from a plastic resin pellet storage silo to a process machine may be several hundred feet, or more. Accordingly, when plastic resin pellets are purchased in bulk, a central vacuum-powered conveying system, powered by one or more large, high capacity industrial vacuum pumps, is a necessity.

Typically, large central plastic resin pellet conveying systems have one or more vacuum pumps, each typically from 5 to 20 horsepower. These central systems include central control connected by wire to each receiver associated with each process machine in the facility. Typically eight, sixteen, thirty-two or sixty-four receivers, each associated with a process machine, may be connected to and served by the central plastic resin pellet vacuum conveying system. Of course, the higher the number of receivers served by the system, the higher the cost.

A factor to be considered in designing such a system is the speed of the plastic resin pellets as they flow through a conduit as the plastic resin pellets are carried by the moving air stream drawn by the vacuum pump. If air flow is too slow, the plastic resin pellets fall out of the air stream, lie on the bottom of the conduit, and there is risk of clogging the conduit. If air flow is too fast, the plastic resin pellets can skid along the conduit surface. In such case, harder, more brittle plastic resin pellets are damaged, resulting in dust within the conduit, which when drawn into the vacuum pump can damage the vacuum pump and render the system inoperative. Softer plastic resin pellets heat up and can melt from friction resulting from contact with the conduit interior surface. This results in "angel hair"—long, wispy-thin strands of plastic film which eventually clog the conduit and cause the system to shut down.

For these reasons, pneumatic plastic resin pellet conveying systems must be designed to produce desired, reasonable conveying speeds for the plastic resin pellets.

Conveying speed of the plastic resin pellets is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is done by properly specifying the vacuum pump by capacity and, in some cases, by varying speed of the vacuum pump as the vacuum pump draws the air in a "vacuum" condition through the conduit, carrying plastic resin pellets in the moving, below atmospheric pressure air. Controlling cubic feet per minute of air flow is an indirect way of controlling plastic resin pellet speed as the plastic resin pellets flow through a conduit of a given diameter.

Typically, a 2 inch diameter conduit requires about 60 cubic feet per minute of air flow for typical plastic resin pellets. A 2½ inch diameter conduit typically requires 100 cubic feet per minute of air flow for typical plastic resin pellets. To achieve these desired air flow volumes, the designer must carefully match the horsepower of a vacuum pump, which has a given cubic feet of air per minute rating, to a selected size conduit, taking into consideration the average distance the plastic resin pellets must be conveyed through the conduit from a storage silo to a receiver or loader. If this results in selection of a 5 horsepower blower/vacuum pump, then a given facility may require several such blowers/vacuum pumps, with each blower/vacuum pump supplying only a selected number of receivers.

A single plastic resin molding or extruding facility might theoretically require a 20 horsepower blower and the corresponding cubic feet per minute capability for the conveyance provided by the blower to meet the total conveying requirements for plastic resin pellets throughout the facility. However, a single 20 horsepower blower would result in far too high a conveying speed for the plastic resin pellets through any reasonable size conduit. As a result, the conveying system for the plastic resin pellets in a large facility is necessarily divided and powered by 3 or 4 smaller blowers, resulting in 3 or 4 different, separate systems for conveyance of plastic resin pellets. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet conveying systems are not consistent. Air flow speed and cubic feet per minute capacity of blowers often vary and are outside of selected design and specification values.

SUMMARY OF THE INVENTION

The instant invention provides an improvement to known pneumatic plastic resin pellet conveying systems, reducing the costs of those systems while providing more consistent control of air speed and delivered cubic feet per minute of air for individual receivers. The invention also facilitates easy expansion of the pneumatic plastic resin pellet conveying system as the system grows. Such expandable systems are made feasible by the inventive vacuum or air flow controller embodying aspects of this invention. The vacuum or air flow controller is a new cubic feet per minute air flow regulator.

By adding a flow regulator manifesting aspects of this invention to every receiver, plant operators can limit air flow in cubic feet per minute to a value that is ideal for that particular receiver, considering conduit diameter and distance over which the plastic resin pellets must be conveyed through that conduit.

Use of the air flow regulator in accordance with this invention allows pneumatic plastic resin pellet conveying systems to utilize a single large high horsepower vacuum pump. In accordance with the invention, each receiver in a facility is fitted with a vacuum flow regulator embodying the invention so the flow for each receiver in cubic feet per minute flow is self-limiting. The invention eliminates the need to size vacuum pumps or blowers to a specific material conduit size or conveyance distance. The flow regulator of the invention permits operators to run a very large vacuum pump or blower at a speed that will maintain a desired high level of vacuum throughout the entire vacuum or pneumatic plastic resin pellet conveying system.

Using larger than standard diameter vacuum conduits allows a significant vacuum reserve to exist in the plastic resin pellet conveying system, without the need for a vacuum reserve tank. Larger diameter conduits also mean there is little loss of vacuum over long distances, even at the most distant receiver to which plastic resin pellets are supplied by the system. Ideally, a variable frequency drive control varies the speed of the single large high horsepower vacuum pump to hold vacuum within a desired range. This saves energy when demand is low and vacuum is at the high end of a desired range. In this aspect of the invention vacuum sensors provide input to control a variable frequency drive, varying the speed of the vacuum pump or blower.

With the flow regulator of the invention facilitating use of high horsepower vacuum pumps or blowers, designers utilizing the invention can now design to load multiple receivers at the same time without fear of dropping vacuum levels too low in portions of the pneumatic or vacuum plastic resin pellet conveying system.

In the plastic resin pellet conveying system aspect of the invention, no central control system is required. Using the flow limiter of the invention, each receiver controls its own operation and is not wired to any central control facility. When the level of plastic resin pellets in the hopper of a process machine falls to a sufficiently low level, a level sensor tells the receiver to load. Coupled to the level sensor is a vacuum sensor, which confirms that the main system has sufficient vacuum available to load the receiver. If too many other receivers are currently loading, and the vacuum level is below the threshold for effective loading, then the receiver will wait until vacuum readings rise. When available system vacuum is sufficient to assure adequate flow of plastic resin pellets into a given receiver, the vacuum sensor causes a vacuum valve associated with the receiver to open the connector of the receiver to the conduit carrying the plastic resin pellets and the receiver loads.

In accordance with one aspect of the invention, each receiver acts on its own information. Use of the high horsepower vacuum pump means that several receivers can load simultaneously. Because no central control computer system is required, the cost of a central control system and the cost of running control wires throughout a plastic facility are eliminated.

The flow limiter aspect of the invention does several things to make such systems in accordance with the invention possible. By limiting cubic feet per minute of flow that is required, there is no limit on the horsepower of the control pump. The risk of a too high a conveyance speed of the plastic resin pellets through the conduit is eliminated. Additionally, if a receiver is not drawing in plastic resin pellets but is just drawing in air, as a result of the main supply of plastic resin pellets being essentially exhausted, the empty conduit of the conveying system will convey a substantial amount of air, which normally would drop the vacuum reserve of the entire pneumatic conveying system very rapidly. But with the flow limiter of the invention such dumping of air into the conveying conduit is substantially reduced. Further contributing to minimized air dump into the vacuum conduit is the receiver's ability to detect system failure or absence of material being loaded, thereby stopping further load cycles and sounding an alarm.

In the air flow limiter aspect of the invention, the limiter has a single moving part, a valve, which relies on two opposing forces, namely gravity in one direction and lift created by air flow in the opposite direction. Because the air flow limiter uses gravity, orientation of the air flow limiter is critical. Air flow must be upward, essentially vertically through the air flow limiter, to counter the downward force of gravity.

The air flow limiter is desirably in the form of a tube with an air flow actuated valve within the tube. In a "no flow" condition, gravity holds the valve closed. However, as air flow through the limiter reaches a pre-selected design value, flow of air over and against a sail-like plate lifts an internal free floating valve, which shuts off air flow through the air flow limiter if the free floating valve rises sufficiently to contact a stop located within the tube.

By adjusting the size and/or shape of the "sail", and the weight of the free floating valve, desired air flow can be regulated very closely. Gravity as a force in one direction means the opening force is constant over the full range of motion of the valve device. (A spring, if one were used, would provide a variable force. However, use of gravity in the flow limiter aspect of the invention eliminates that variable).

In the flow limiter aspect of the invention, at the desired design cubic feet per minute of air flow, the valve opens as it lifts. The valve would continue moving upwardly except for the fact that the valve reaches a point of air flow restriction, where the valve holds air flow steady at the desired design value. If the valve moves further upwardly towards a "closed" position, this reduces air flow, causing the valve to drop. If the valve drops below the control level, this allows more air flow and consequently the valve rises. As a result, the valve reaches the desired design valve equilibrium control point instantly and accurately.

Known air flow shutoffs are subject to "vacuum pull", causing them to shut off completely once air begins to flow. This is because in known shutoffs, vacuum pull of the vacuum pump is always present. In the invention, a short vertical tube closes against a flat horizontal surface. In the flow limiter aspect of the invention, air flow is directed through the center of the short tube and escapes over the top edge of the short tube and then around open edges of a flat shutoff surface. A flat, desirably triangular or star-shaped partial plate is positioned in the air flow below and connected to the short tube. This plate acts as the sail in the air flow and will, at the designed desired cubic feet per minute air flow rate, provide enough lift to raise the short tube against the shutoff plate.

At shut off, with vacuum above the flat shutoff surface and air pressure below the flat shutoff surface, most of the air pressure forces are against the walls of the short tube. Those forces are radially outwardly directed, namely they are horizontal, and do not exert vertical force that would make the movable portion of the valve, namely the short tube, move in a vertical direction.

The surface of the end of the short tube at the short tube edge is a horizontal surface and can provide a small vertical force. For this reason, the flow limiter aspect of the invention uses a very thin wall short tube to minimize the horizontal surface area of the short tube.

In the flow limiter aspect of the invention, air flow rate in cubic feet per minute can be adjusted by adding or subtracting weight from the floating valve, or by adjusting the surface area of the sail, or by adjusting the size or shape of the sail in the air flow.

Accordingly, in one of its aspects, the invention provides an air flow regulator having a vertically oriented tube, a pair of open-ended telescoping tubular internal segments within the tube, with an outer tubular segment being fixed and the other being slidably moveable along the fixed segment in the axial direction. In this aspect, the invention further includes a plate extending partially across the interior of the vertically oriented tube and positioned for contacting the moveable one of the telescoping tubular segments and limiting travel of the moveable telescoping tubular segment, with the plate covering the upper, open end of the moveable telescoping tubular segment upon contact therewith. In this aspect, the invention yet further includes a sail positioned in the vertically oriented tube below the telescoping segments, a strut connecting the sail and the moveable telescoping tubular segment, and a baffle positioned to directed upward air flow within the tube through the telescoping tubular segments, where the moveable telescoping tubular segment moves vertically within the tube unitarily with the sail responsively to air flow upwardly through the tube against the sail.

The tubular segments are preferably cylindrical; the surface of the plate contacted by the moveable tubular segment is preferably planar; the portion of the moveable tubular segment contacting the plate surface is preferably annular.

In a variation of terminology, a surface of the plate contacted by the moveable tubular segment is flat, the tubular segments are cylindrical and the circular edge of the tubular segment contacting the plate service is annular and normal to the axis of the tubular segment.

In yet another one of its aspects, this invention provides an air flow regulator consisting of a vertical oriented tube, a tubular segment within the tube, which segment is moveable in the axial direction, a plate extending at least partially across the interior of the tube for contacting the movable tubular segment and defining a limit of travel of the moveable tubular segment, a sail positioned in the tube below the moveable tubular segment and being moveable vertically within the tube, a strut connecting the tubular segment and the sail, and a baffle connected to and located within the tube defining a lower limit of travel of the moveable tubular segment upon contact of the strut with an upper extremity of the baffle. The moveable tubular segment is in sliding telescoping engagement with the tubular portion of the baffle, directing upward air flow within the tube, the moveable tubular segment being moveable unitarily with the sail in response to upward air flow through the tube contacting the sail.

In yet another one of its aspects, this invention provides an air flow regulator having a vertically oriented tube with a sail assembly positioned in the tube and moveable therewithin responsively to air flow through the tube, to regulate air flow through the tube and to stop air flow thorough the tube upon air flow exceeding a preselected value.

In yet another one of its aspects, this invention provides a method for regulating air flow involving the steps of providing a vertically oriented tube, positioning a moveable sail assembly including a sail within the tube, positioning a stop within the tube, and permitting the sail assembly to move responsively to air flow through the tube between a position at which air flows around the sail assembly and through the tube and a position at which the sail assembly contacts the stop and blocks air flow through the tube.

In yet another one of its aspects, this invention provides air flow regulating apparatus including a vertically oriented first tube, a vertically oriented second tube which is moveable along and within the first tube, a baffle within the first tube for forcing air flow in the first tube through the second tube, a guide within the first tube for limiting the second tube to vertical co-axial movement within and relative to the first tube, a sail within the first tube being connected to the second tube and being moveable responsively to air flow within the first tube, and a stop within and connected to the first tube for limiting vertically upward travel of the second tube.

DESCRIPTION OF THE PREFERRED EMBODIMENT AND BEST MODE KNOWN FOR PRACTICE OF THE INVENTION

Figure 1:
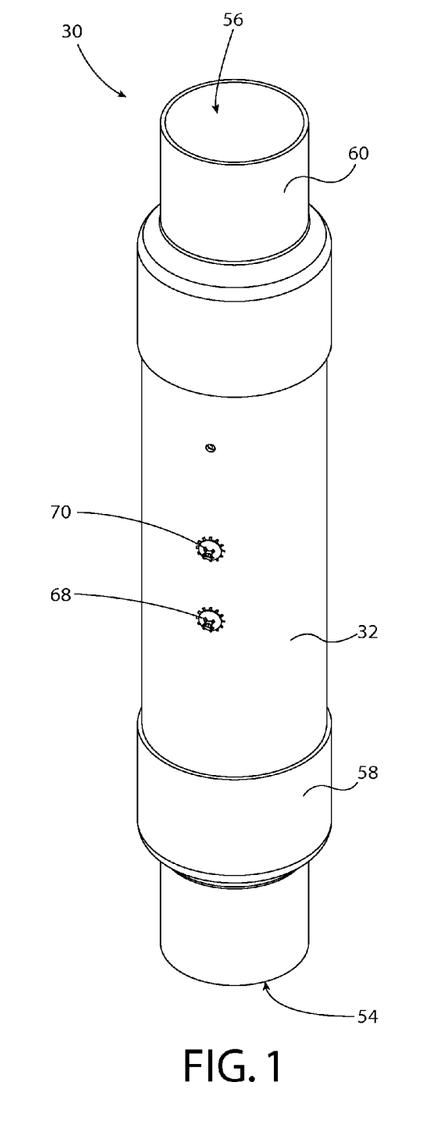
FIG. 1 is an isometric view of the exterior of an air flow limiter manifesting aspects of the invention.
Figure 2:
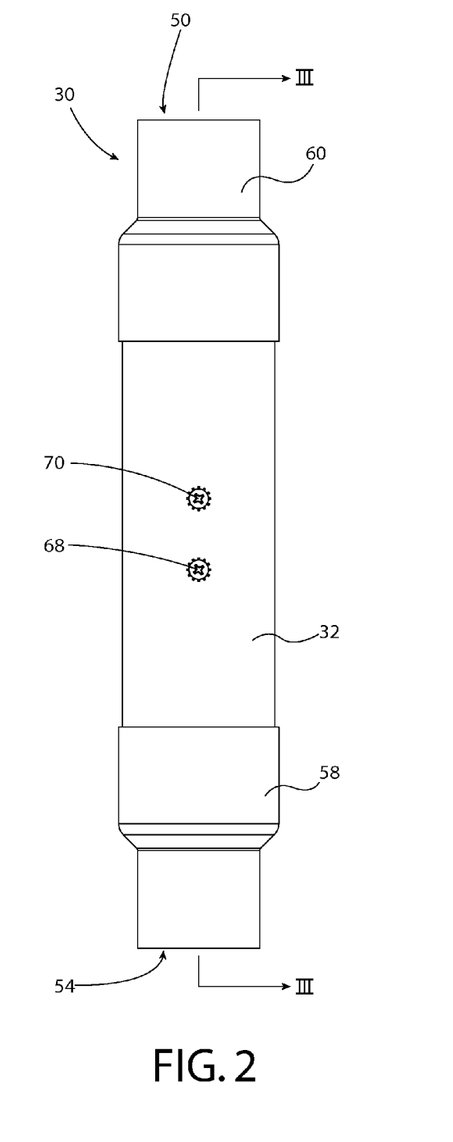
FIG. 2 is a front elevation of the air flow limiter illustrated in FIG. 1.

Referring to the drawings in general and to FIG. 1 in particular, air flow limiter 30 is preferably in the general form of a vertically oriented tube, preferably having inlet and outlet ends 54, 56 respectively. The tubular character of air flow limiter 30 is apparent from FIGS. 1 through 6, where air flow limiter 30 preferably includes a vertically oriented exterior tube 32, with open-end caps 58, 60 defining and providing open inlet and outlet ends 54, 56 respectively. End caps 58, 60 are open, of generally cylindrical configuration, and are configured to fit closely about vertically oriented tube 32 so as to provide a substantially air tight fit between end caps 54, 56 and tube 32.

Figure 3:
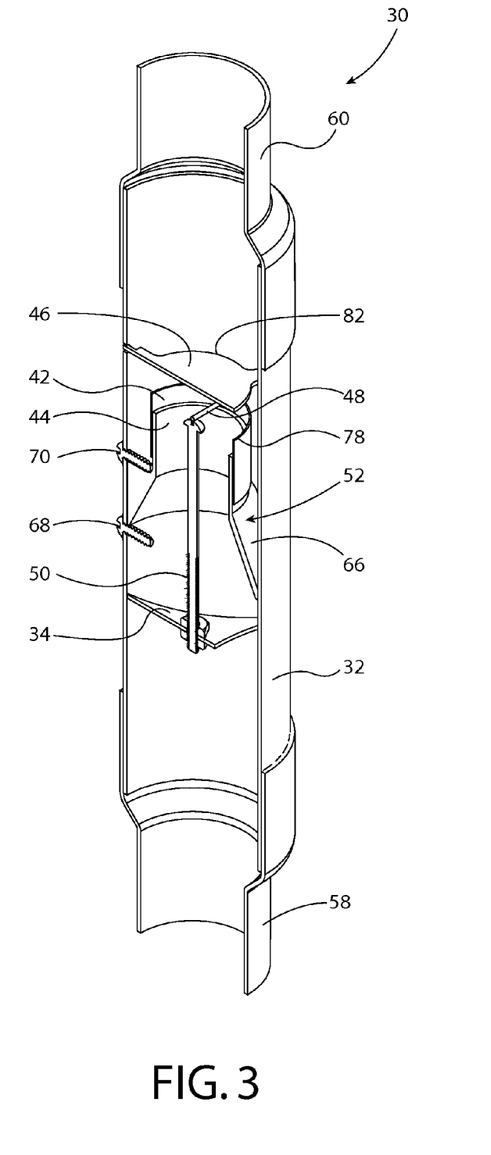
FIG. 3 is an isometric sectional view of the air flow limiter illustrated in FIGS. 1 and 2, with the section taken at arrows 3-3 in FIG. 2.

As illustrated in FIG. 3, air flow limiter 30 preferably includes, within vertically oriented exterior tube 32, a horizontally positioned plate 46, which is oriented perpendicularly to the axis of tube 32. Plate 46 is preferably configured as a circular disk of lesser diameter than the inner diameter of vertically oriented tube 32, with plate 46 further preferably including three legs extending outwardly from the circular interior disk portion of plate 46. Legs of plate 46 are designated 62 in FIG. 7, while the circular interior portion of plate 46 is designated 64 in FIG. 7. Plate 46 is secured to the interior of vertically oriented outer tube 32 by attachment of legs 62 to the interior surface of tube 32. Any suitable means of attachment, such as by welding, adhesive, mechanical screws, or end portion of legs 62 defining tabs fitting into slots within tube 32 as shown in FIG. 3, may be used.

Figure 4:
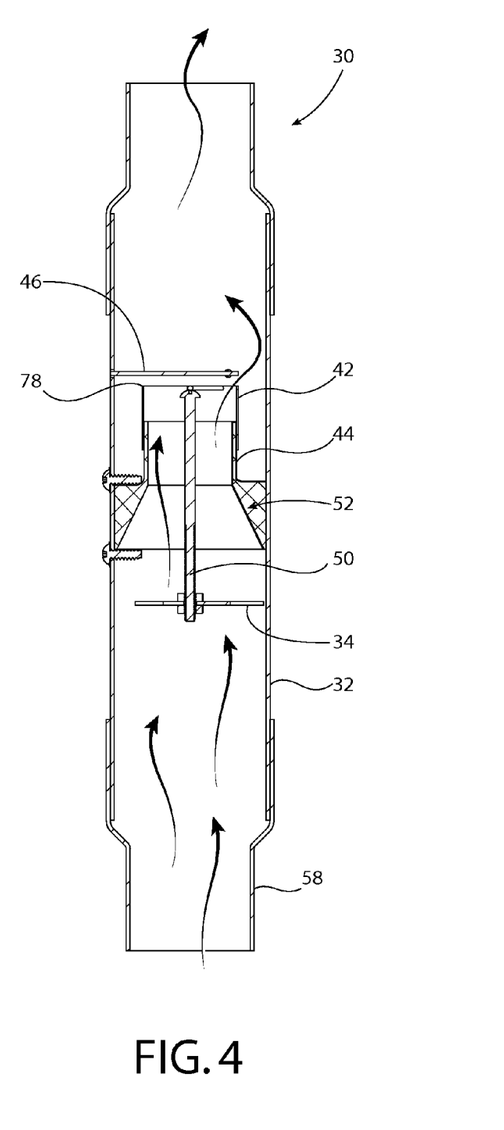
FIG. 4 is a sectional view in elevation of the air flow limiter illustrated in FIGS. 1, 2, and 3, with the section taken at lines and arrows 3-3 in FIG. 2, with air flow through the air flow limiter being depicted in FIG. 4 by curved dark arrows.
Figure 5:
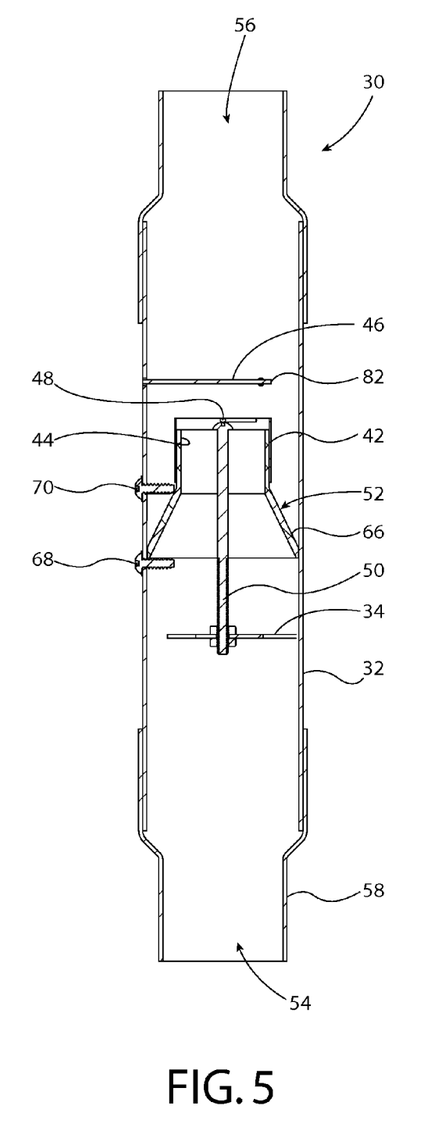
FIG. 5 is a sectional view in elevation similar to FIG. 4 but with the air flow limiter internal parts in position whereby there is no air entering the air flow limiter and hence there is no air flow upwardly through the air flow limiter, in contrast to such air flow being shown in FIG. 4.

As best shown in FIGS. 3, 4, and 5, a baffle 52 is positioned within vertically oriented outer tube 32 below plate 46. Baffle 52 has a lower conical portion 66 and an upper cylindrical portion 44, with cylindrical portion 44 defining a fixed internal tubular segment of air flow limiter 30. Baffle 52 is preferably retained in position by a pair of screws designated 68, 70 respectively. Baffle 52 preferably rests on screw 68. Screw 70 preferably fits against the fixed internal tubular segment 44 portion of baffle 52 to secure baffle 52 in position within vertically oriented external tube 32. Lateral force applied by screw 70 in a direction perpendicular to the axis of vertically oriented external tube 32, with screw 70 in contact with fixed internal tubular segment 44, serves to effectively retain baffle 52 against movement within vertically oriented external tube 32.

Figure 7:
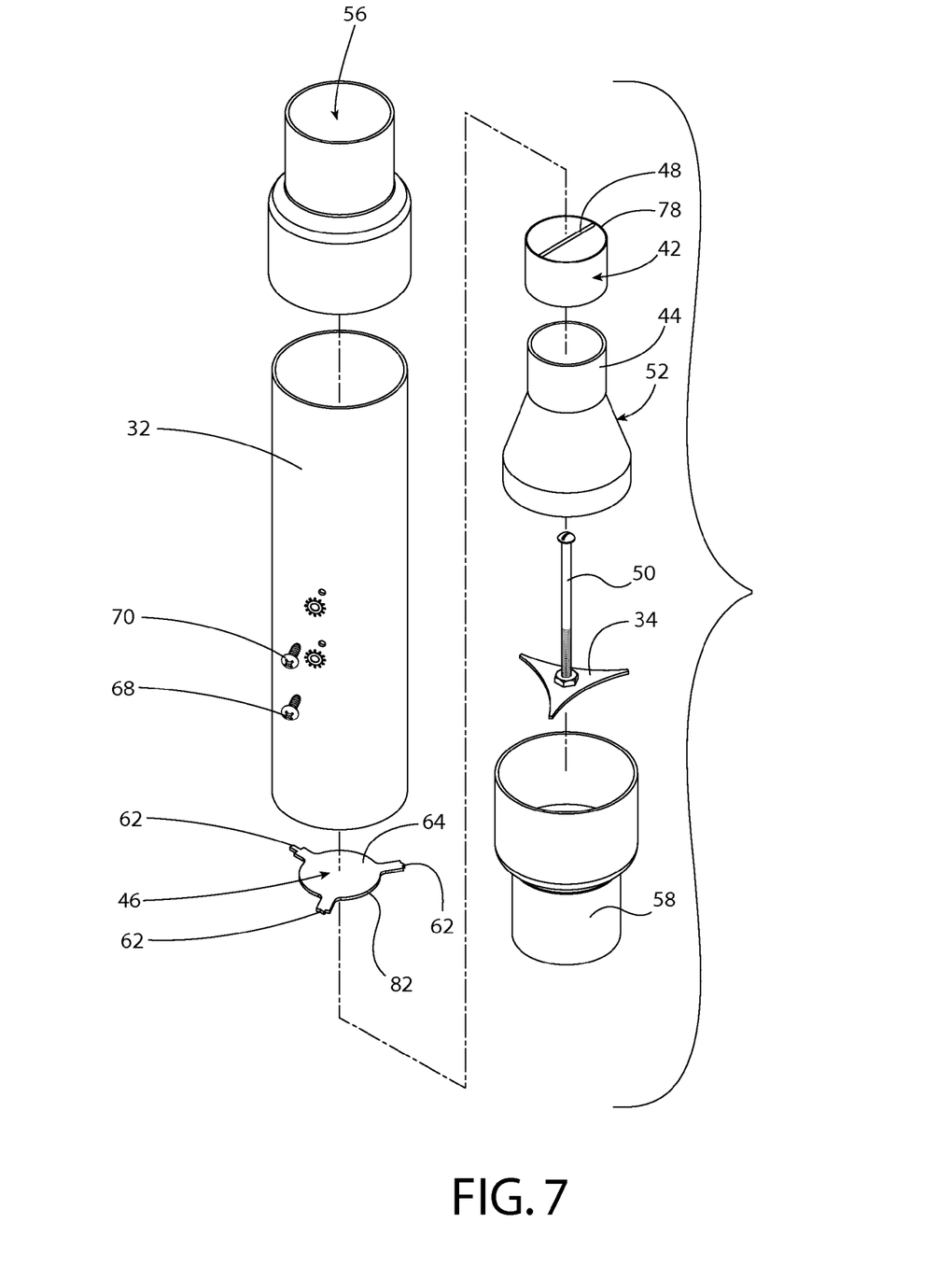
FIG. 7 is an exploded isometric view of the air flow limiter illustrated in FIGS. 1 through 6.
Figure 8:
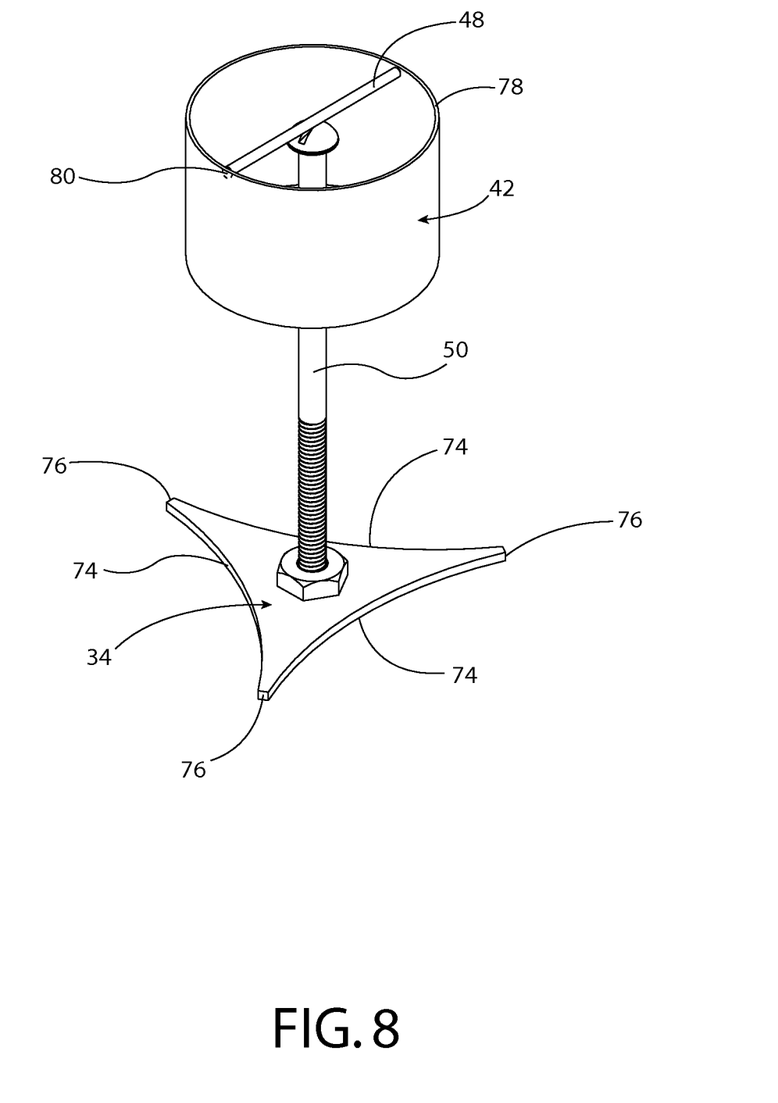
FIG. 8 is an isometric view of the movable portion of the air flow limiter valve illustrated in FIGS. 1 through 7.

The upper portion of baffle 52, defining fixed internal tubular segment 44, is adapted for sliding telescopic engagement with, and movement therealong by, movable tubular segment 42. Fixed to movable tubular segment 42 is a first strut 48 which preferably extends transversally across the upper portion of movable tubular segment 42 and is preferably secured on either end to movable tubular segment 42, as illustrated in FIG. 8. Preferably extending downwardly from first strut 48 is a second strut 50 which is preferably secured to first strut 48 and preferably also to a sail 34, as illustrated in FIG. 8 and in FIGS. 3, 4, 5, 6 and 7.

Movable sail 34 is preferably planar and positioned fixedly on second strut 50 to remain perpendicular with respect to the axis of vertically oriented outer tube 32. Movable sail 34 is preferably of generally triangular configuration, as best illustrated in FIGS. 7 and 8, with the sides of the triangle curving slightly inwardly. The curved edges 72 of movable sail 34 converge and terminate to form small rectangularly shaped extremities of sail 34 which are designated 76 in FIG. 7.

Movable sail 34 is positioned within generally vertically oriented outer tube 32 so that rectangular extremities 76 are closely adjacent to but do not contact the inner surface of vertically oriented outer tube 32, so long as sail 34 moves vertically up and down within vertically oriented external tube 32. The rectangular shape of extremities 76 with their outwardly facing planar surface assures minimal friction and consequent minimal resistance to movement of movable sail 34 in the event one of rectangular extremities 76 contacts the interior surface of vertically oriented tube 32, should sail 34 for some reason move laterally or otherwise and become skew to the vertical axis of tube 32.

Movable internal tubular segment 42 is telescopically movable, unitarily with sail 34, relative to and along fixed internal tubular segment 44. A lower limit of movement of movable tubular segment 42 is illustrated in FIG. 5, where the first strut portion 48 of movable tubular segment 42 (shown in FIG. 8) rests on the upper circular edge of fixed internal tubular segment 44. This is the condition when no air is flowing through the air flow limiter and gravity causes sail 34 together with movable internal tubular segment 42 to drop with first strut 48 coming to rest on the upper circular edge of fixed tubular segment 44.

When air is flowing through air flow limiter 30, as illustrated generally in FIG. 4, the moving air pushes against movable sail 34, moving it upwardly. Movable internal tubular segment 42 moves upwardly unitarily with sail 34 due to the fixed connection of movable tubular segment 42 and movable sail 34 made via first and second struts 48, 50 as illustrated in FIGS. 3, 4, 5, 7, and 8.

Figure 6:
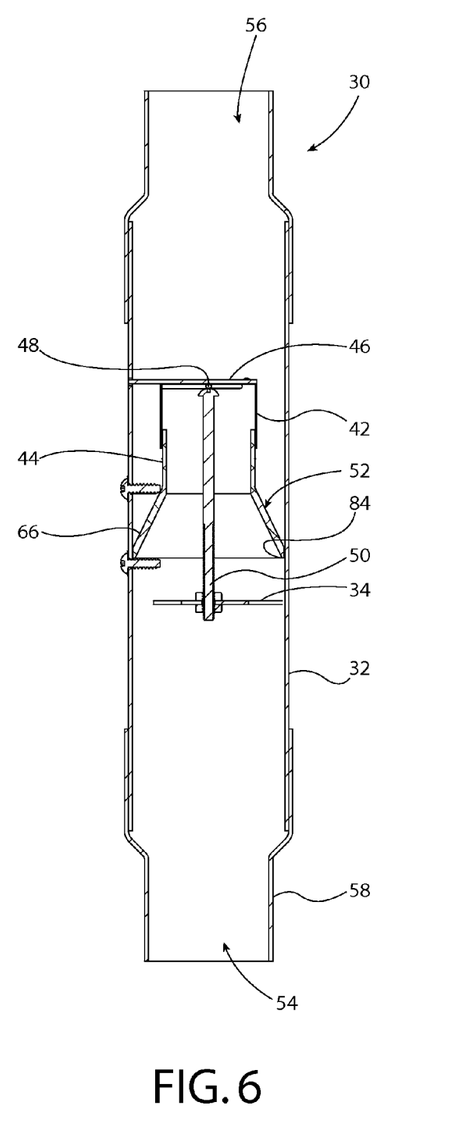
FIG. 6 is a sectional view in elevation similar to FIGS. 4 and 5 but with the air flow limiter internal parts in position where there is an excessive amount of air attempting to enter the air flow limited but there is no air flow upwardly through the air flow limiter due to the air flow limiter valve having moved to block air flow upwardly through the air flow limiter, in contrast to air flow upwardly through the air flow limiter as shown in FIG. 4.

If air flow upwardly through air flow limiter 30 reaches an extreme value, above an acceptable level of operation of the system of which air flow limiter 30 is a part, the excessive force (resulting from the high volume air flow contacting sail 34) pushes sail 34 upwardly to the point that upper annular edge 78 of movable internal tubular segment 42 contacts plate 46. In this condition, which is illustrated in FIG. 6, no air can pass between the upper annular edge 78 of movable tubular segment 42 and flow limiting horizontal plate 46, and air flow stops.

Once air flow stops through vertically oriented outer tube 32, gravity pulling downwardly on sail 34, connected movable internal tubular segment 42, and first and second struts 48, 50, causes these parts, which may be connected together and fabricated as a single integral assembly as shown in FIG. 8, to move downwardly, thereby again permitting air flow upwardly through air flow limiter 30 as depicted generally in FIG. 4. Consequently, air flow limiter 30 is self-regulating in that when air flow is too high, the force of air moving or impinging on sail 34 pushes movable internal tubular segment 42 upwardly until upper annular edge 78 of movable tubular segment 42 contacts plate 46 and no air can then escape upwardly between the upper annular edge 78 of movable tubular segment 42 and plate 46. This stops air flow through flow limiter 30 until downward movement of sail 34 together with movable internal tubular segment 42 moves upper annular edge 78 of movable tubular segment 42 away from plate 46, again permitting air to flow through the upper extremity of movable tubular segment 42, with air passing between upper annular edge 78 of movable internal tubular segment 42 and flow limiting horizontal plate 46, and then escaping through upper outlet end 56 of air flow limiter 30.

With the self-regulating characteristic of air flow limiter 30, the assembly consisting of movable internal tubular segment 42, first and second struts 48, 50 and sail 34 may oscillate somewhat about the position at which the desired air flow is supplied, as the blower or vacuum pump driving or drawing air through flow limiter 30 varies in output of cubic feet per minute of air blown or drawn.

Desirably, ends of first strut 48, which is depicted as being horizontally disposed in the drawings, are mounted in movable tubular segment 42 in movable fashion such that first strut 48 can move slightly, rotationally, relative to movable internal segment 42. This is to provide a small amount of "play" in the event movable sail 34 and second strut 50, which is vertically oriented and connected to movable sail 34, become skew with respect to the vertical axis of vertically oriented exterior tube 32. Should this occur, the movable characteristic of first strut 48, being slightly rotatable relative to movable internal tubular segment 42, effectively precludes movable internal tubular segment 42 from binding with respect to fixed internal tubular segment 44 and thereby being restricted from what would otherwise be freely telescoping movement of movable internal tubular segment 42 relative to fixed internal tubular segment 44.

Desirably first strut 48 is rotatable relative to movable internal tubular segment 42, to provide maximum freedom of vertical motion of movable internal tubular segment 42 in the event movable sail 34 becomes skew to the axis of vertically oriented exterior tube 32, with consequent frictional force restricting vertical movement of movable sail 34.

Baffle 52 preferably includes two portions, the upper portion preferably being defined by fixed internal tubular segment 44 and a lower portion preferably being defined by conical portion 66 of baffle 52. A lower edge of baffle 52 is circular and is designated 84 in the drawings. Circular edge 84 fits closely against the annular interior wall of vertically oriented exterior tube 32 so that all air passing upwardly through air flow limiter 30, namely through vertically oriented exterior tube 32, is constrained to flow through the interior of baffle 52. The tight fitting of the circular lower edge of baffle 52 against the interior wall of vertically oriented exterior tube 32 forces all air entering flow limiter 30 from the bottom to flow through the interior of baffle 52, flowing upwardly through lower conical portion 66 of baffle 52. The air then flows further upwardly through the interior of fixed internal tubular segment 44. Thereafter, if movable internal tubular segment 42 is spaced away from flow limiting horizontal plate 46, air flows along the surface of movable internal tubular segment 42, passing the upper annular edge 78 of movable internal tubular segment 42; air then flows around the space between edge 82 of flow limiting horizontal plate 46 and the interior annular wall of vertically oriented exterior tube 32. The air then flows out of air flow limiter 30 via open outlet end 56 formed in end cap 60.

In an alternate embodiment, baffle 52 may be constructed from two pieces that fit closely together, with the two pieces being in facing contact in the area where they define fixed internal tubular segment 44, but diverging one from another in the area where they define conical portion 66 of baffle 52. In such embodiment, illustrated in FIG. 10, the two portions of baffle 52 are designated "66A" and "66B" where they diverge, with baffle portion 66A serving to channel air flow upwardly through vertically oriented exterior tube 32 into fixed internal tubular segment portion 44 of baffle 52. The space between the lower parts of baffle portions 66A and 66B is filled with a filler material 86 to provide additional assurance that all air entering vertically oriented exterior tube 32 from the bottom flows through fixed internal tubular segment 44 and on through movable internal tubular segment 42, and does not pass around the edge of baffle 52, namely between baffle 52 and the interior surface of vertically oriented exterior tube 32. Filler material 86 provides additional structural rigidity for flow limiter 30.

Figure 9:
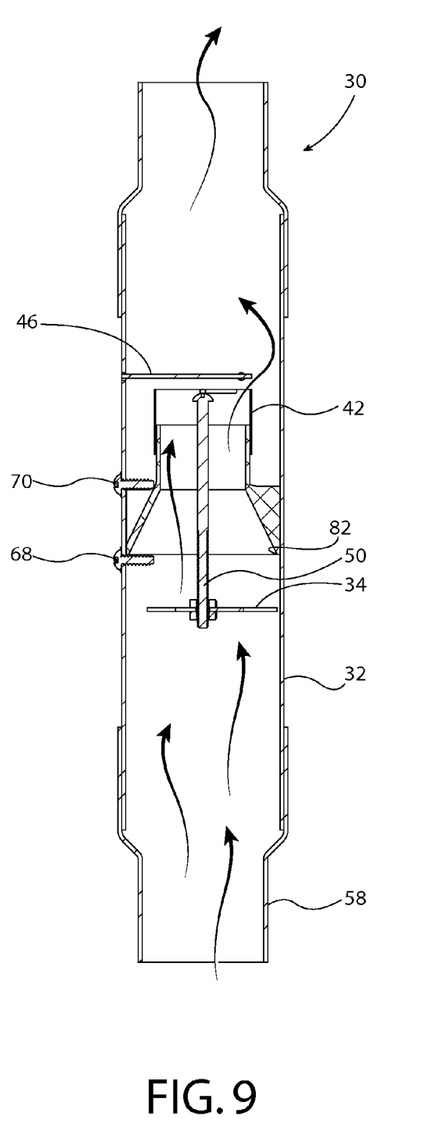
FIG. 9 is a sectional view of the air flow limiter similar to FIGS. 4, 5 and 6, illustrating an alternate construction of the baffle portion of the air flow limiter.
Figure 10:
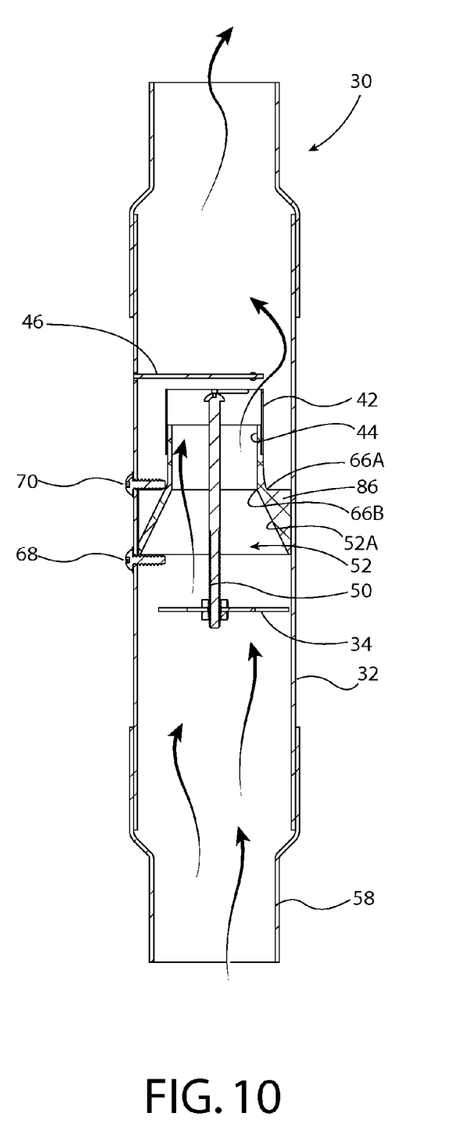
FIG. 10 is sectional view of the air flow limiter similar to FIGS. 4, 5, 6 and 9, illustrating a second alternate construction of the baffle portion of the air flow limiter.

In another alternative environment, baffle 52 is one piece, preferably molded plastic, as illustrated in FIG. 9, where baffle 52 is designated 52B to distinguish it from the baffle construction illustrated in FIG. 10 and the baffle construction illustrated in the other drawing figures. In the baffle construction illustrated in FIG. 9, the one piece construction means that there is no need or space for any filler material. The baffle construction illustrated in FIGS. 1 through 7 is preferred.

The assembly illustrated in FIG. 8 comprising the moveable internal tubular segment 42, first strut 48, second strut 50 and moveable sail 34 may preferably be constructed as a single piece or several pieces as required. The assembly of moveable internal segment 42, first and second struts, 48, 50 and moveable sail 34 is referred to as a "sail assembly." It is not required that first and second struts 48, 50 be separate pieces; they may preferably be fabricated as a single piece. Additionally, second strut 50, which has been illustrated as a machine screw in FIGS. 7 and 8, need not be a machine screw. Any suitable structure can be used for second strut 50 and it is particularly desirable to fabricate first and second struts 48 and 50 from a single piece of plastic or metal, either by machining or by welding, or by otherwise fastening two pieces together. Similarly with the hex nut, which is unnumbered in FIG. 8 and illustrated there, any other suitable means for attachment of the second strut or a vertical portion of a strut assembly to moveable sail 34 may be used.

Flow limiter 30 preferably contains no springs. Flow limiter 30 preferably contains no sensors to provide feedback to a control device; no sensors are needed since because flow limiter 30 is self-regulating. Flow limiter 30 preferably includes a tubular valve, closing against a flat surface, where the tubular valve is defined by movable internal tubular segment 42 closing against flow limiting horizontal plate 46. Movable internal tubular segment 42 is in the form of an open-ended cylinder and is connected to a plate in the form of movable sail 34 to move movable tubular segment 42 against flow limiting horizontal plate 46. Flow limiter 30 uses gravity alone to open the valve defined by the assembly of movable internal tubular segment 42 and movable sail 34 and the connecting structure therebetween.

In the in the embodiment of the flow limiter illustrated in FIGS. 1 through 6, the movable internal tubular segment 42 is preferably made with a very thin wall, preferably from metal tubing where the wall is preferably less than 1/32 inch in thickness.

Air flow limiter 30 functions equally well with a vacuum pump drawing air through air flow limiter 30 from bottom to top by application of vacuum to outlet end 56, or by air being supplied under positive pressure at inlet end 54 for passage upwardly through air flow limiter 30.

In the claims appended hereto, the term "comprising" is to be understood as meaning "including, but not limited to" while the phrase "consisting of" should be understood to mean "having only and no more".

The following is claimed:

1. An air flow regulator, comprising:
   a. a vertically oriented tube;
   b. a pair of open-ended telescoping tubular internal segments within the tube, an outer tubular segment being fixed and the other being slide ably movable along the fixed segment in the axial direction;
   c. a plate extending partially across the interior of the vertically oriented tube, positioned for contacting the movable one of the telescoping tubular segments and limiting travel of the moveable telescoping tubular segment, the plate covering an open upper end of the movable telescoping tubular segment upon contact therewith;
   d. a sail positioned in the vertically oriented tube below the telescoping segments;
   e. a strut connecting the sail and the moveable telescoping tubular segment;
   f. the baffle positioned to direct upward air flow within the tube into the telescoping tubular segments;
   the movable telescoping tubular segment moving vertically within the tube unitarily with the sail responsive to air flow upwardly through the tube against the sail.

2. The air flow regulator of claim 1 wherein the tubular segments are cylindrical.

3. The air flow regulator of claim 1 wherein the surface of the plate contacted by the movable tubular segment is planar.

4. The air flow regulator of claim 2 wherein the portion of the moveable tubular segment contacting the plate surface is annular.

5. The air flow regulator of claim 1 wherein a surface of the plate contacted by the movable tubular segment is flat, the tubular segments are cylindrical, and a circular edge of the tubular segment contacting the plate surface is annular and normal to the axis of the tubular segment.

6. An air flow regulator, consisting of:
   a. a tube;
   b. a tubular segment within the tube being movable in the axial direction;
   c. a plate extending at least partially across the interior of the tube, for contacting the movable tubular segment and defining a limit of travel of the movable tubular segment;
   d. a sail connected to the moveable tubular segment and being movable therewith within the tube;
   e. a baffle, connected to and within the tube, defining a second limit of travel of the movable tubular segment, the moveable tubular segment being in sliding telescoping engagement with a tubular portion of the baffle, the baffle directing air flow within the tube into the tubular segment;
   the movable tubular segment being movable unitarily with the sail in response to upward air flow through the tube contacting the sail.

7. A method for regulating air flow, comprising:
   a. providing a tube;
   b. positioning a movable sail assembly including a sail within the tube;
   c. positioning a plate as a stop within the tube and maintaining the plate perpendicular to the axis of the tube;
   d. permitting the sail assembly to move responsively to air flow through the tube between a position at which air flows around the sail assembly and through the tube and a position at which the sail assembly contacts a stop and blocks air flow through the tube.

8. The method of claim 7 further comprising maintaining the sail perpendicular to the axis of the tube.

9. The method of claim 7 further comprising permitting the sail to tilt relative to the remainder of the sail assembly respecting the axis of the tube.

10. The method of claim 7 further comprising providing a sail which is triangular.

11. The method of claim 7 further comprising providing a telescoping cylindrical member as a part of the sail assembly.

12. The method of claim 11 further comprising providing within the tube a stationary baffle having a cylindrical outlet, and permitting the cylindrical member of the sail assembly to move telescopingly within the baffle cylindrical outlet.

13. Air flow regulating apparatus, comprising:
   a. a tube;
   b. a second tube movable along and within the first tube;
   c. a baffle within the first tube for forcing air flow in the first tube through the second tube;
   d. a guide within the first tube for restraining the second tube to coaxial movement within and relative to the first tube;
   e. a sail within the first tube, connected to the second tube and being movable responsively to air flow within the first tube;
   f. a stop within and connected to the first tube for limiting axial travel of the second tube.

14. Apparatus of claim 13 wherein the second tube has an edge adapted for substantially air tightly contacting a sealing surface of the stop to preclude air flow through the second tube upon the second tube contacting the sealing surface.

15. Apparatus of claim 14 wherein the stop is perpendicular to axes of the first and second tubes.

16. Apparatus of claim 15 wherein the first and second tubes are coaxial and the first tube is movable coaxially within the second tube.

17. Apparatus of claim 15 wherein the stop is planar.

* * * * *